United States Patent [19]

Saijo et al.

[11] Patent Number: 4,693,591

[45] Date of Patent: Sep. 15, 1987

[54] MICROFILM AND MICROFILM PRINTER

[75] Inventors: Takao Saijo, Tokyo; Masafumi Fujita, Kanagawa, both of Japan

[73] Assignee: Minolta Camera Kabushiki Kaisha, Osaka, Japan

[21] Appl. No.: 890,479

[22] Filed: Jul. 30, 1986

[30] Foreign Application Priority Data

Aug. 5, 1985 [JP] Japan ................................ 60-172099
Aug. 31, 1985 [JP] Japan ................................ 60-192901

[51] Int. Cl.⁴ ............................................. G03B 27/52
[52] U.S. Cl. .................................. 355/41; 353/26 R; 355/55; 355/64
[58] Field of Search ................ 355/41, 50, 55, 64, 355/77, 3 SH, 14 SH; 353/26 R

[56] References Cited

U.S. PATENT DOCUMENTS

| | | | |
|---|---|---|---|
| 3,136,463 | 6/1964 | Froese | 355/64 X |
| 3,744,890 | 7/1973 | Suzuki et al. | 353/26 |
| 3,885,855 | 5/1975 | Stearns | 353/26 |
| 3,981,582 | 9/1976 | Bookless | 355/64 X |
| 4,116,560 | 9/1978 | Dragani et al. | 355/41 |
| 4,277,165 | 7/1981 | Wada et al. | 355/55 |
| 4,408,876 | 10/1983 | Steidle | 355/64 X |
| 4,597,663 | 7/1986 | Yoshiura et al. | 355/55 X |

FOREIGN PATENT DOCUMENTS 50-53050 6/1975 Japan .
59-30550 10/1984 Japan .

Primary Examiner—Richard A. Wintercorn
Attorney, Agent, or Firm—Burns, Doane, Swecker & Mathis

[57] ABSTRACT

A microfilm comprises a plurality of microimages continuously formed on a film base thereof, each of the microimages being provided with a size mark which has a distinctiveness for indicating the size of the corresponding microimage. A printer adapter for use with such a microfilm comprises a sensor for detecting the size marks. Correct size coping sheets are, therefore, supplied in accordance with the signal from the sensor.

8 Claims, 49 Drawing Figures

Fig. 4
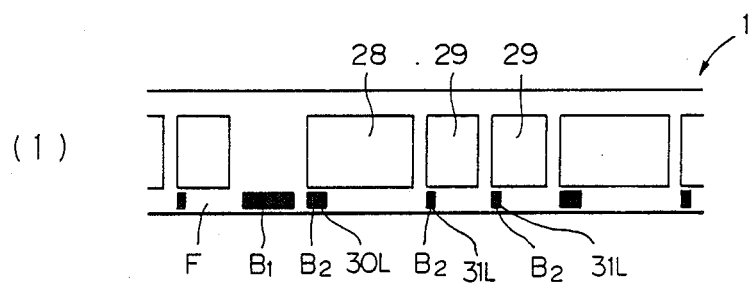
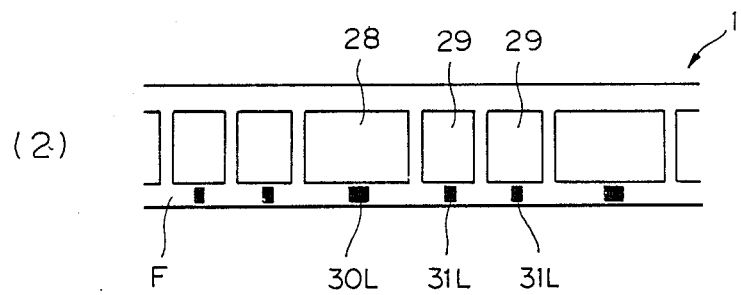

Fig. 11
(1)
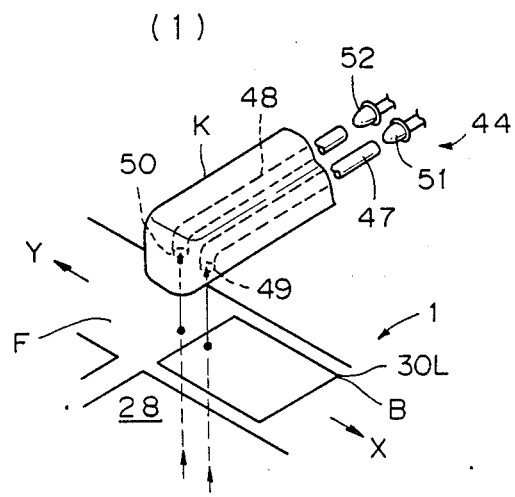
(2)
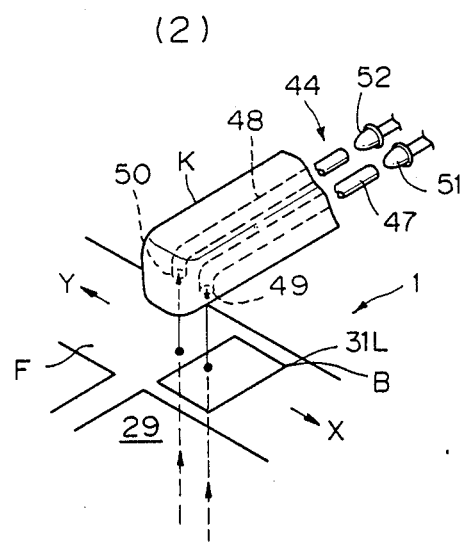

Fig. 14 (1)
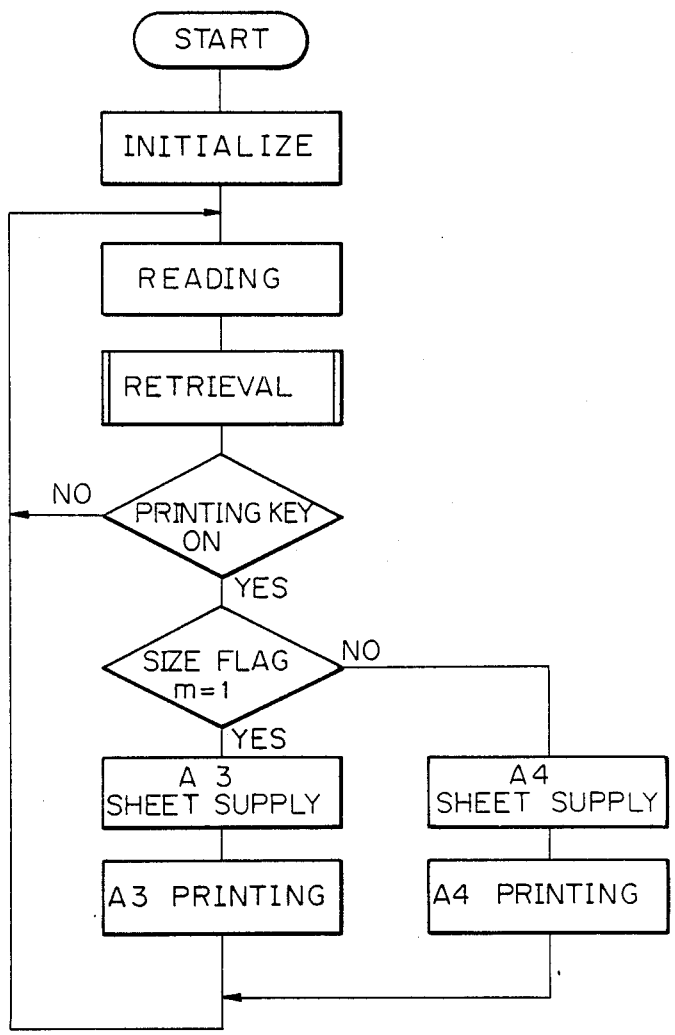

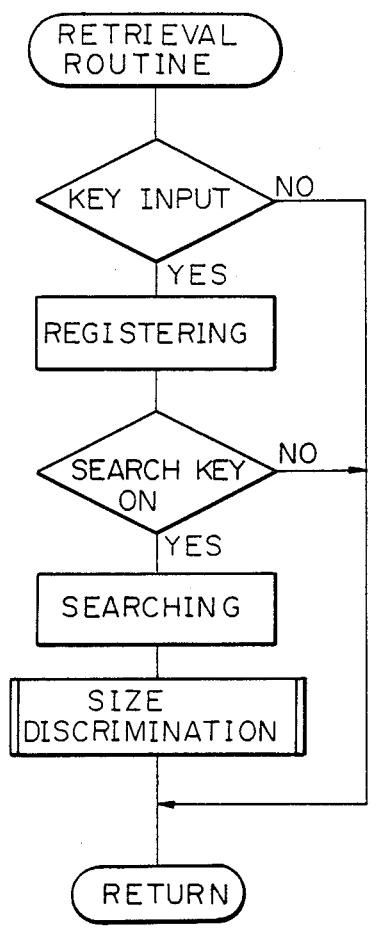
Fig. 14 (2)

Fig. 15
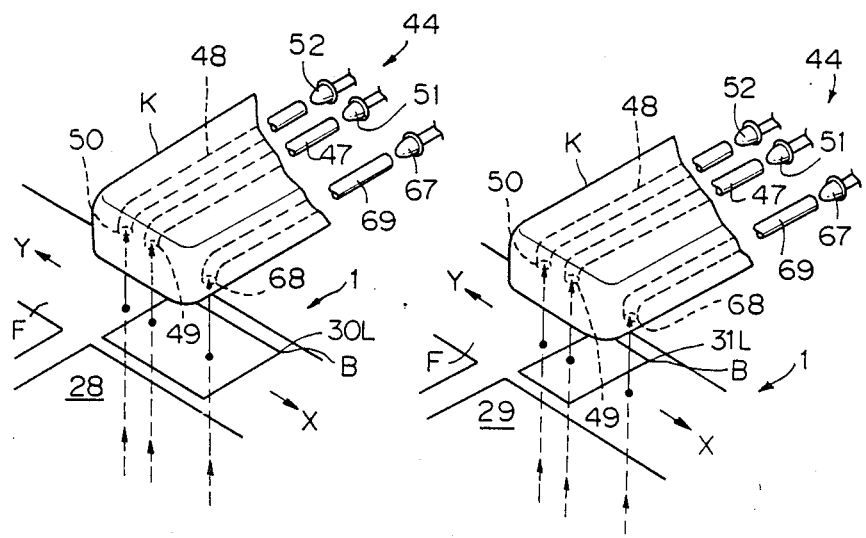
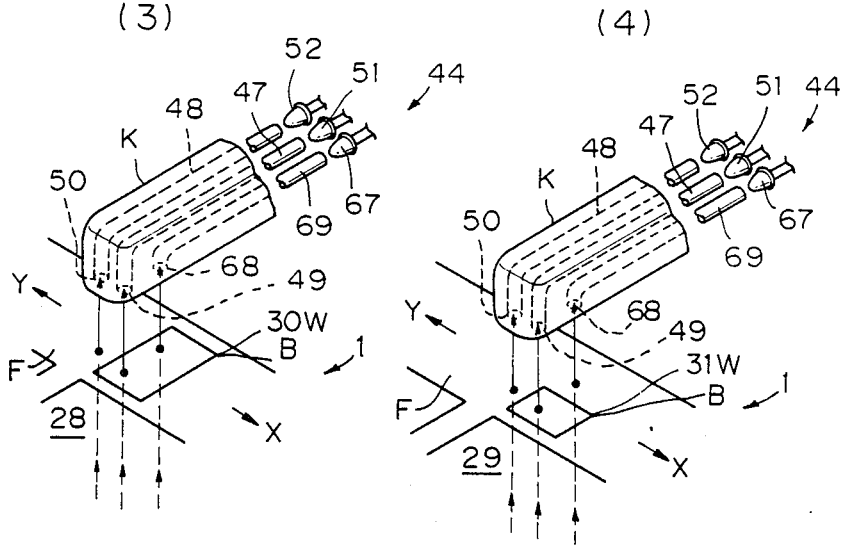

Fig. 18
(1)
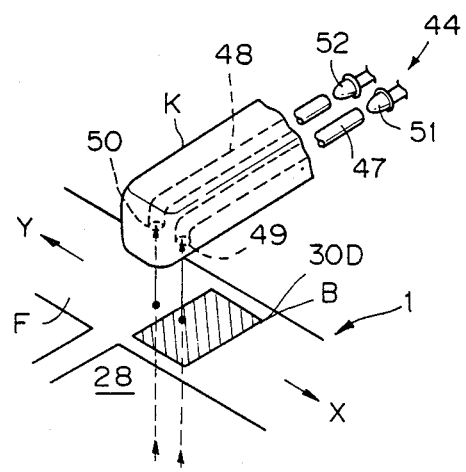
(2)
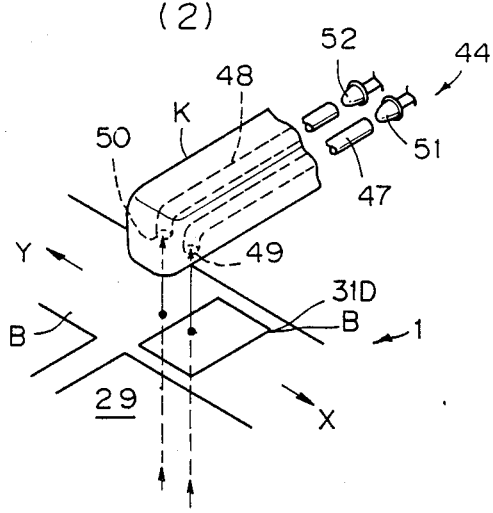

Fig. 22
(1)
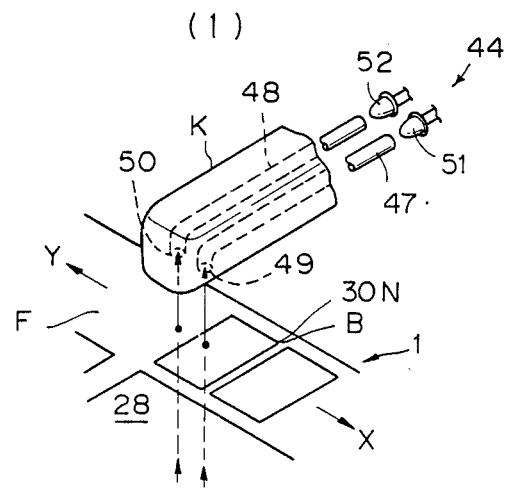
(2)
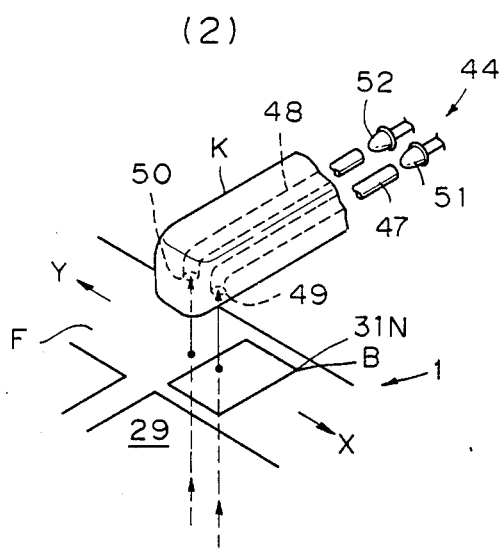

Fig. 24 (1)
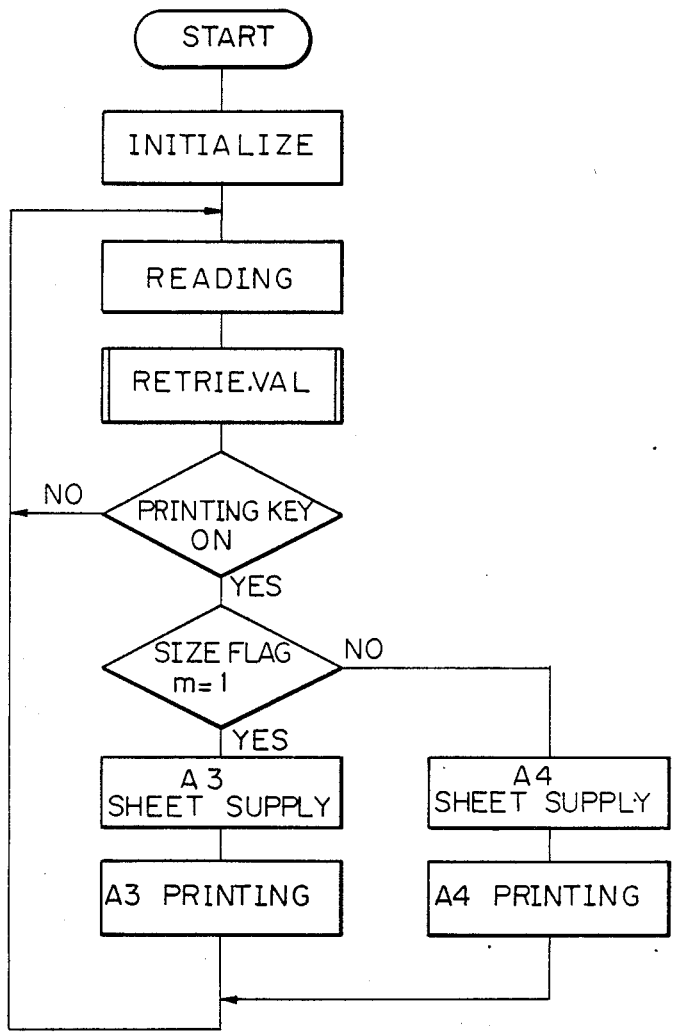

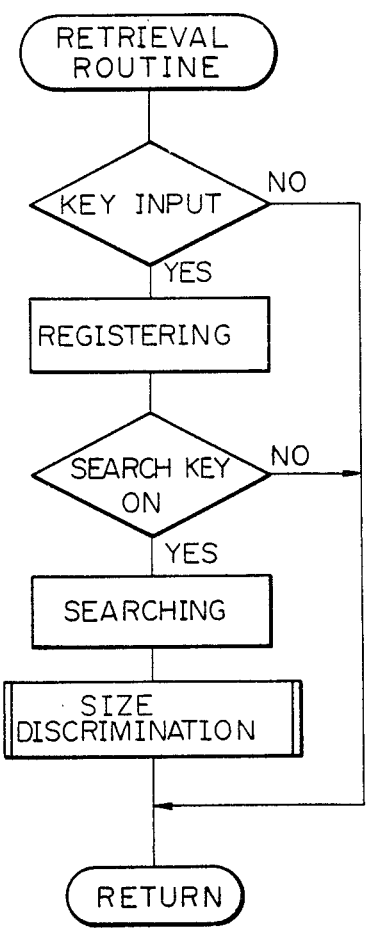
Fig. 24 (2)

Fig. 25
(1)
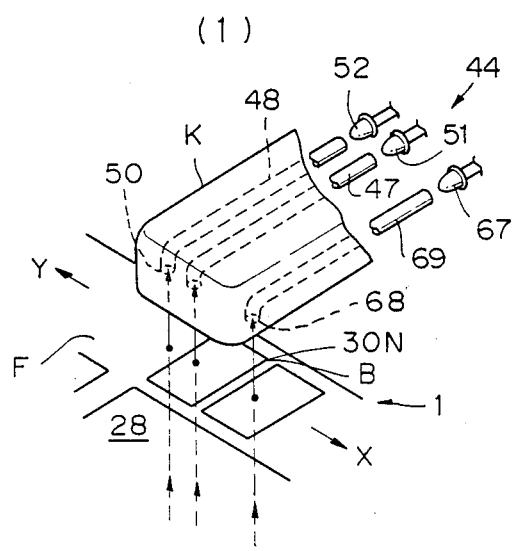
(2)
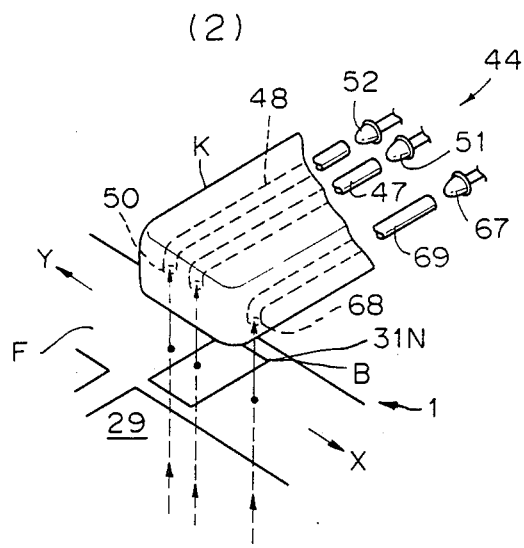

MICROFILM AND MICROFILM PRINTER

BACKGROUND OF THE INVENTION

1. Field of the Invention

This invention relates to a microfilm and a printer adapted for use with a microfilm, and more particularly, to means for detecting and discriminating the sizes of microimages photographed on the microfilm.

In a microfilm, a large number of microimages are photographically formed on a reduced scale in proportion to corresponding A3, A4 size sheets, for example. Therefore, when the microimages are enlarged and copied from the microfilm by a reader/printer or a printer, it is necessary to supply correct sizes of copying sheets, such as A3, A4 and the like, corresponding to the sizes of the respective microimages.

2. Description of the Related Art

In a reader/printer or the like, when the microimages are read or copied, the size detection and discrimination of microimages has been conventionally conducted as follows.

An operator directly visually observes the microfilm or a screen on which the microimages are enlarged and projected, in order to discriminate the sizes of the microimages. However, such a detecting method is troublesome for the operator and sometimes causes errors in detection, and therefore, errors in selection of the copying sheets. Where such errors occur, the correct copying sheets are not supplied in the printer, so that if, for example, an A4 sheet was incorrectly supplied in place of an A3 sheet, a part of image would not be formed on the copying sheet, conversely, if the A3 sheet was incorrectly supplied in place of the A4 sheet, the image would be copied only on the central portion of the copying sheet and toner would be adhered to the peripheral portion thereof, which would increase the consumption of the toner.

Japanese Unexamined Patent Publication No. 50-53050 discloses a reader/printer for apertured cards, each card having an aperture containing information indicating the size of the microimage photographically formed on the card. Therefore, the size of microimage can be detected by reading out the aperture information. However, at least an exclusive detecting means is necessary for reading out such information. Therefore, in this reader/printer, the means for projecting images and the peripheral structural portions thereof must become complicated.

A detecting means, such as disclosed in Japanese Unexamined Patent Publication No. 59-30550, is also known, in which a plurality of detecting sensors are arranged so as to come into and out of the whole effective area of the optical path from the microimage of the microfilm and the size of the microimage is directly detected and discriminated in accordance with the signals from these sensors, so that a correct size of copying sheet corresponding to the size of the microimage is selectively supplied. However, this detecting system requires many sensors, which not only increases the total cost but also makes the process of discrimination complicated, and a special driving means is necessary for driving the plurality of sensors coming into and out of the optical path. Therefore, in continuous copying, it is difficult to increase the efficiency of operation.

In U.S. Pat. No. 3,744,890, a microfilm is provided with marks at the peripheries of the microimages. However, these marks do not serve to indicate the sizes of the microimages, but are either frame detection marks or frame group (case) indication marks.

SUMMARY OF THE INVENTION

An object of the present invention is to provide a microfilm which is provided with size marks photographically formed on the peripheries of the microimages in order to easily and accurately detect the sizes of the microimages.

Another object of the present invention is to provide a microfilm printer, capable of detecting the microimages of the microfilm and supply correct size copying sheets in correspondence to the sizes of the microimages.

According to the present invention, there is provided a microfilm comprising: a film base; a plurality of microimages defining film frames photographically and continuously formed on the film base; and each of the microimages being provided at a periphery thereof on the film base with a size indication mark which has a distinctiveness for indicating the size of the corresponding microimage.

The printer adapted for use with such a microfilm comprising: means for enlarging and projecting the microimages of the microfilm on a photo-sensitive media, means for transferring the enlarged images on the photo-sensitive media to copying sheets, means for detecting said size indication marks; means for controlling a sheet supply signal in accordance with a signal from the mark detecting means; and means for selectively supplying the copying sheets on the basis of the sheet supply signal from the controlling means.

BRIEF DESCRIPTION OF THE DRAWINGS

FIGS. 2 (1) to (4) show microfilms having marks used both as size marks and blip marks; and FIGS. 3 (1) to (4) show microfilms having marks some of which are used both as size marks and blip marks;

FIGS. 4 (1) and (2) are plan views of other embodiments of the microfilm according to the present invention;

FIGS. 6, 7, 8 and 9 illustrate an embodiment of a reader/printer; in which FIG. 6 is a block diagram of the basic system thereof; FIG. 7 is a perspective view of the printer; FIG. 8 is a front view thereof, and FIG. 9 is a side elevational cross-sectional view thereof;

FIGS. 11 to 14 illustrate a first embodiment of a detecting and controlling means according to the present invention; in which FIGS. 11 (1) and (2) illustrate the detecting means including two detecting elements, one for detecting long size marks and the other for detecting short marks; FIG. 12 is a block diagram showing the control means; and FIG. 13 is a timing chart illustrating the signals in this control means; and FIGS. 14 (1), (2), and (3) illustrate a basic control process, a retrieval routine, and a discrimination routine, respectively;

FIGS. 15, 16, and 17 illustrate second and third embodiments; in which FIGS. 15 (1) and (2) show the second embodiment of the means for detecting long and short size marks; and FIGS. 15 (3) and (4) show the third embodiment of the detecting means for detecting wide and narrow size marks; FIG. 16 shows a block diagram of the control means; and FIG. 17 shows a flow chart of the basic control;

FIGS. 18 to 21 illustrate a fourth embodiment using dark size marks and light size marks; in which FIGS. 18 (1) and (2) show the detecting means, FIG. 19 shows the control means; FIG. 20 shows the respective signals; and FIG. 21 shows a block diagram of the basic control;

FIGS. 22, 23 and 24 (1), 24 (2), and 24 (3) illustrate a fifth embodiment using two size marks an one size mark for indicating different sizes; in which FIGS. 22 (1) and (2) show the detecting means; FIG. 23 shows the control means; and FIGS. 24 (1), 24 (2) and 24 (3) show the control process thereof; and, FIGS. 25, 26, and 27 illustrate a sixth embodiment for detecting two size marks and one size mark by an exclusive third detecting element; in which FIGS. 25 (1) and (2) show the detecting means.

DESCRIPTION OF THE PREFERRED EMBODIMENTS

Microfilm

Figure 1:
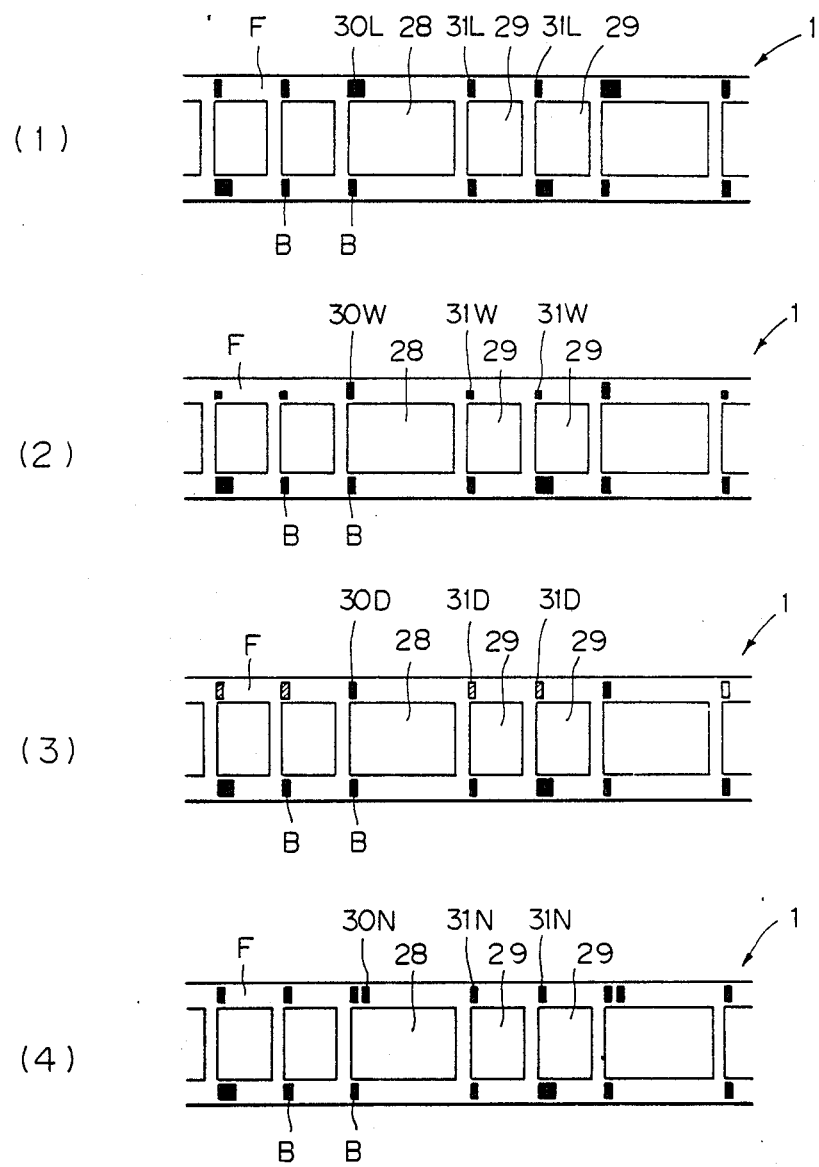
FIGS. 1, 2, and 3 are plan views of roll-film type microfilms according to the present invention; in which FIGS. 1 (1) to (4) show microfilms having size marks as well as blip marks.
Figure 2:
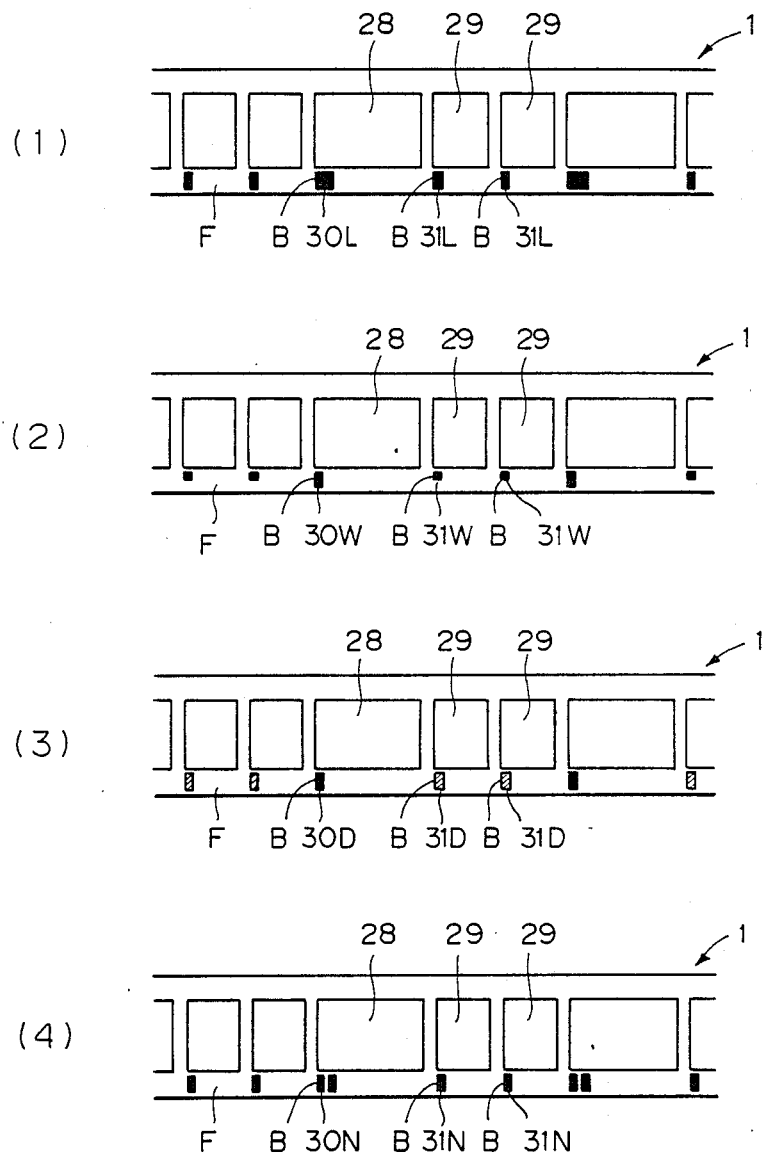
Figure 3:
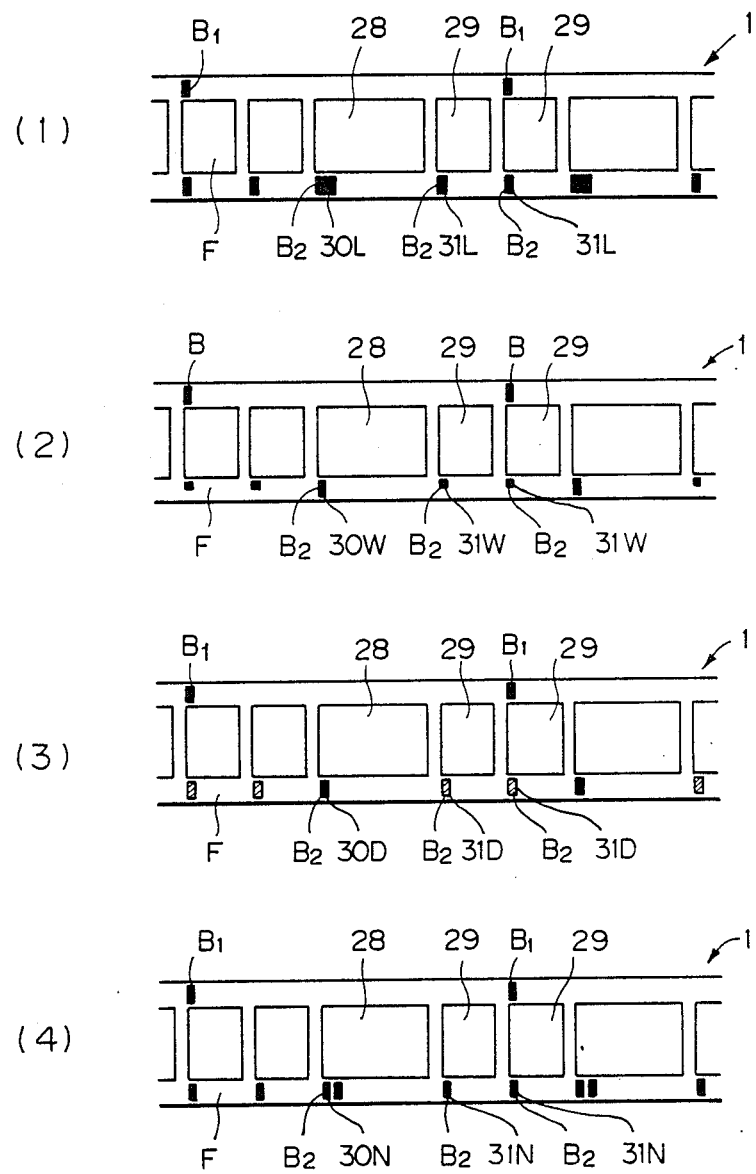

Referring now to FIGS. 1, 2, and 3, the microfilm 1 is an elongated roll film strip having a width of 16 or 35 mm, and includes a plurality of continuous microimages 28 and 29 of two kinds of sizes. These two sizes are the sizes of the microimages corresponding to, for example, A3 and A4. However, the combination of sizes of course may be, for example, B4 and B5, A4 and A5, or any other combination. There also may be a combination of three kinds of sizes. The roll film 1 may be a single stage simple reflex type or a two stage "duo" type.

The roll film 1 has size marks 30 and 31 indicating the sizes of the respective microimages 28 and 29 adjacent thereto, and located at a margin of the microfilm 1. Thus, for example, the A3 size microimage 28 is provided with the marks 30 and the A4 size microimage 29 is provided with the marks 31, respectively. Each mark 30 and 31 has an optical transparency different from that of a peripheral film base F.

The size marks 30 and 31 are made distinctive from each other so as to be detectable by a detecting means as mentioned hereinafter. In FIGS. 1, 2, and 3, the respective portions (1) illustrate films including long marks 30L and short marks 31L which have different lengths along the longitudinal direction of the microfilm 1; the respective portions (2) illustrate films including wide marks 30W and narrow marks 31W which have different widths along the transverse direction of the microfilm 1; the respective portion (3) illustrate films including dark marks 30D and light marks 31D which have different optical transparencies; and the respective portions (4) illustrate films including marks 30N and marks 31N which have a different number, but the same size, of respective mark areas. The marks 30 and 31 also can be made distinguishable by changing the respective color, various size, shape, position, and the like. Among these varieties, the size marks 30L and 31L having different lengths, as shown in FIGS. 1, 2, and 3 by the portions (1), can be constituted by applying conventional blip marks B thereto.

Although, in the above mentioned microfilm 1, the sizes of the respective microimages 28 and 29 have the 30 and 31 indicating their sizes, it is also possible to detect the sizes of the microimages 28 and 29 by detecting whether or not there is a size mark. Therefore, in order the distinguish two kinds of sizes of the microimages 28 and 29, it is not always necessary to provide a plurality of distinguishing marks.

The relationship between the size marks 30 and 31 and the blip marks B will now described. The blip mark B is conventionally used as a frame detection mark, a frame group (or case) indication mark, or the like, for accessing a frame page of the respective microimages 28 and 29, or a frame group consisting of a series of frames, or for determining a frame position. In the embodiments shown in FIG. 1, the channel B, i.e., the upper margin in the drawing of the microfilm 1, is provided with size marks 30 and 31 and the channel A, i.e., the lower margin in the drawing of the microfilm 1, is provided with blip marks B. Therefore, there is no particular relationship between the size marks 30 and 31 and the blip marks B. In the embodiments shown in FIG. 2, the channel B is not provided with marks, but the channel A is provided with marks which serve both for the size marks 30 and 31 and for the conventional blip marks B as frame detection marks. Thus, the conventional blip marks used as frame detection marks also can be rearranged to be used as size marks 30 and 31. In the embodiments shown in FIG. 3, the channel B is provided with the blip marks $B_1$ as frame group indication marks, and the channel A is provided with marks which serve both for the size marks 30 and 31 and for conventional blip marks $B_2$ as frame group indication marks. The above-mentioned marks which serve both for the size marks 30 and 31 and for conventional blip marks $B_1$ as frame detection marks have an advantage in that a means for detecting conventional blip marks B can be most easily applied for this purpose.

As shown in FIG. 4 (1), long marks may also be used as blip marks $B_1$ serving as frame group indication marks, and middle and short marks also may be used as the marks which serve both for the blip marks $B_1$ as frame detection marks and for the size marks 30L and 31L. In this case, there are no microimages 28 and 29 at the positions where the long marks as blip marks $B_1$ are located.

In the embodiments shown in FIGS. 1, 2, and 3, a front edge of each of the size marks 30 and 31 is aligned with the front edge of each of the microimages 28 and 29. This is advantageous if the marks also serve as marks for frame positioning. On the other hand, as shown in FIG. 4 (2), the marks also may be located at the respective center positions of the microimages 28 and 29 in the longitudinal direction of the microfilm 1.

Figure 5:
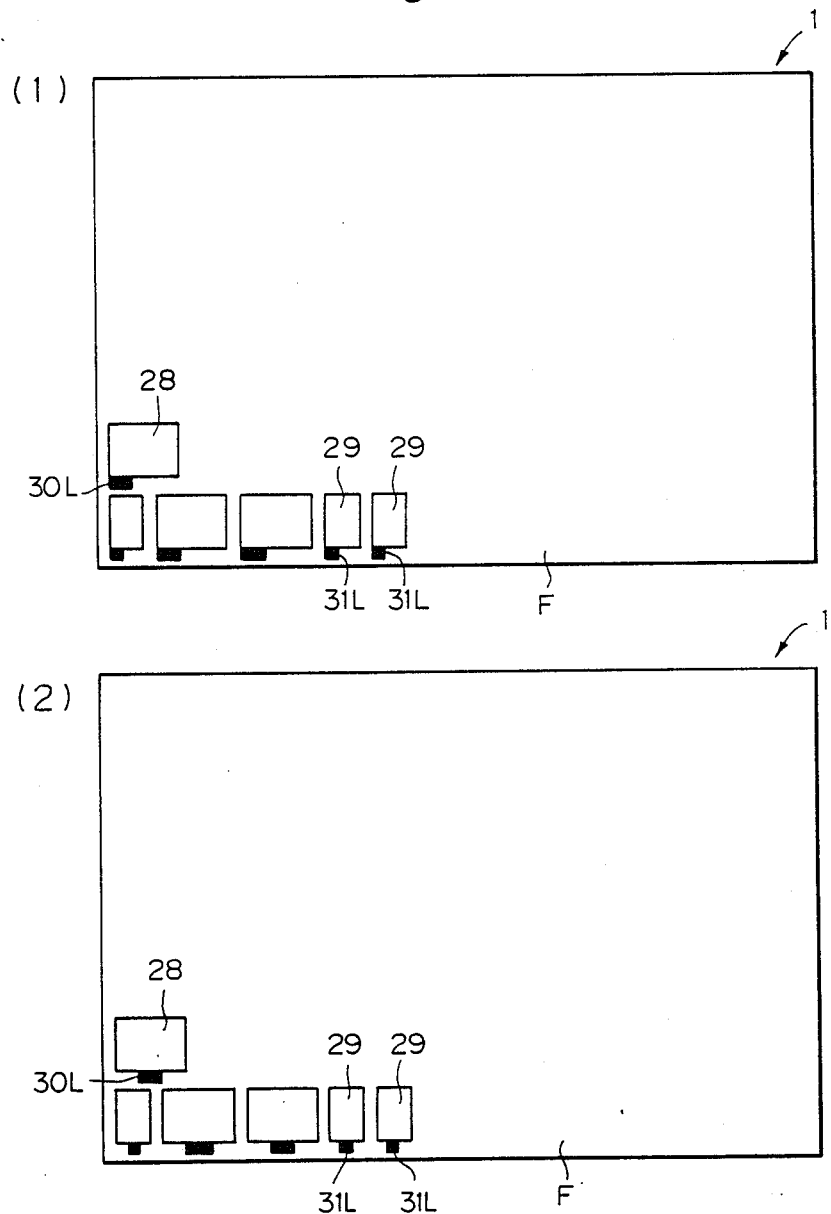
FIGS. 5 (1) and (2) are plan view of fish films according to the present invention.

The microfilm 1 shown in FIGS. 1, 2, 3, and 4 is a roll film as mentioned above, but a fish film, as shown in FIG. 5, also may be used for this purpose. Consequently, the fish film in which a plurality of microimages 28 and 29 are arranged in multistages, regardless of whether or not it is, for example, a jacket type, includes size marks 30 and 31 in a similar manner as mentioned above. In FIG. 5 (1), an embodiment is shown in which the front edges of the long size marks 30L and the short size marks 31L are aligned with the front edges of the respective microimages 28 and 29. Conversely, FIG. 5 (2) illustrates an embodiment in which such marks are located at the central positions of the respective microimages 28 and 29 in the longitudinal direction of the microfilm 1.

Reader/Printer

Figure 6:
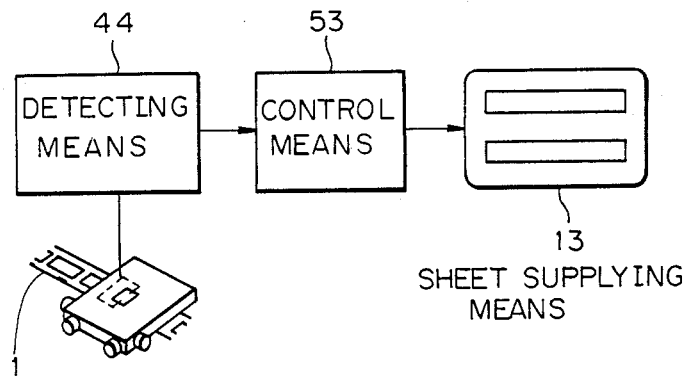
Figure 7:
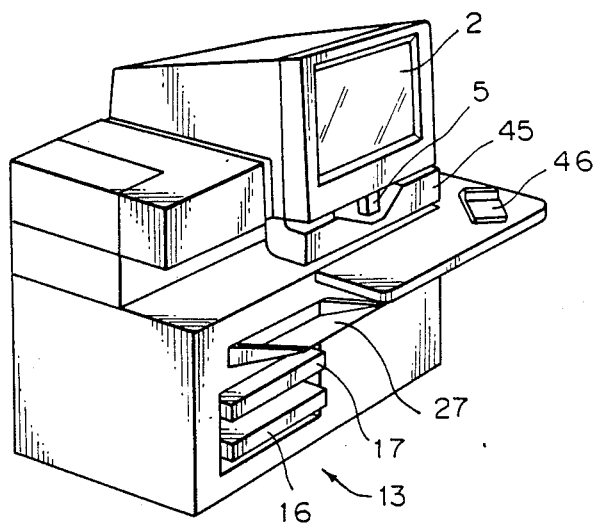
Figure 8:
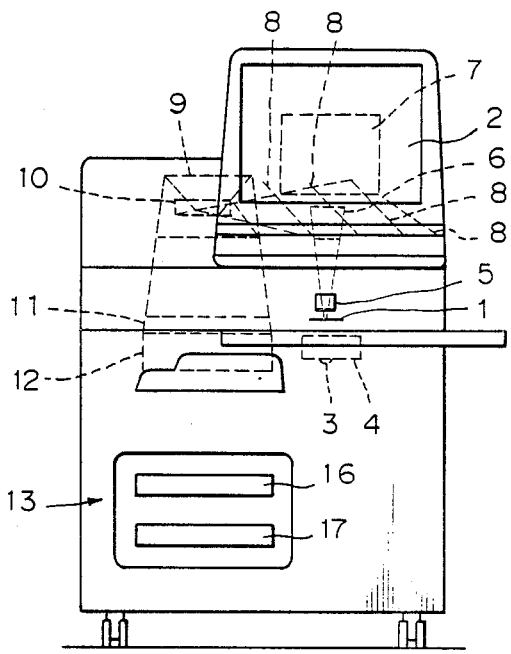
Figure 9:
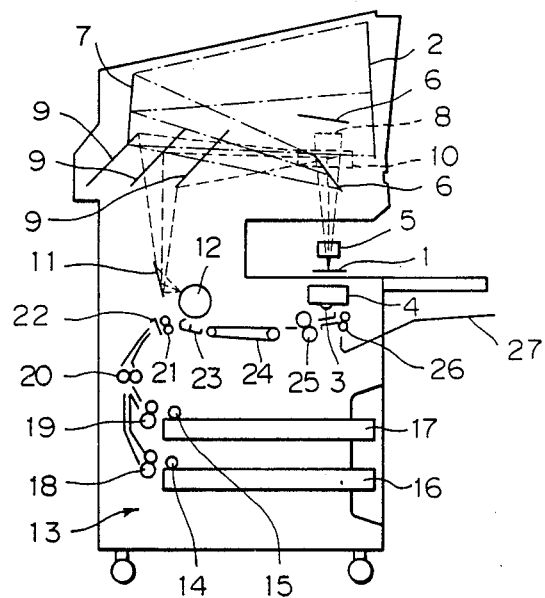

FIGS. 6, 7, 8, and 9 illustrate an embodiment of a reader printer, in which FIG. 6 is a block diagram of the basic system thereof, FIG. 7 is a perspective view of the printer, FIG. 8 is a front view thereof, and FIG. 9 is a side elevational cross-sectional view thereof. In FIG. 6, a reader printer according to this invention generally includes a microfilm 1, a sheet supplying means 13, a detecting means 44, and a control means 53. This reader printer is operated either in a reading mode, in which the microimages in the microfilm 1 are set in a predetermined place and enlarged and projected onto a screen 2, or in a printing mode, in which the enlarged images are printed on copying sheets.

Light emitted from a light source 3, such as a luminance lamp, is focussed by a condenser lens 4 and irradiated toward the lower surface of the microfilm 1 so that a microimage is enlarged by a projection lens 5.

In the reading mode, the light is reflected by a reader first mirror 6, which exists in a reading position (a lower position in FIG. 9), and a fixed reader second mirror 7, so that the enlarged image is projected on the screen 2 which is located at an upper front position of the printer body. In this mode, a print first mirror 8 and a print third mirror 9 are in the right and front positions, respectively, so that they are retracted from the reader light path.

In the printing mode, the above-mentioned reader first mirror 6 is moved upward from the reading position and retracted from the printer light path. On the other hand, the print first mirror 8 and print third mirror 9 are simultaneously moved leftward and rearward, respectively, to a scanning start position, and subsequently, are moved rightward and forward, respectively, toward a scanning end position to conduct scanning. Thus, the light is transversely reflected by the print first mirror 8, directed rearward by a fixed print second mirror 10, and directed downward by the print third mirror 9. Thus, the microimage is slit-exposed through a fixed fourth mirror 11 on a drum-like photosensitive media 12, so that an enlarged latent image is formed on the photosensitive media 12 which is uniformly static-electrified.

A sheet supplying means generally indicated by a reference numeral 13 is capable of selectively supplying one of various sizes of copying sheets, in accordance with a signal from the control means 53, to a transfer station as mentioned hereinafter. In the illustrated sheet supplying means 13, pickup rollers 14 and 15 are arranged in sheet cassettes 16 and 17, respectively, in such a manner that they are in firm contact with the uppermost of the sheets of various sizes, such as A3 and A4, accommodated in the sheet cassettes 16 and 17, respectively. The pickup rollers 14 and 15 are selectively rotated by driving means switched in accordance with signals selectively output from a control means 53. Therefore, in accordance with such signals, either the pickup roller 14 or the pickup roller 15 is rotated so as to supply either A4 or A3 copying sheets from the corresponding cassette 16 or 17. The copying sheets are subsequently fed by rollers 18 or 19, arranged in certain positions, and rollers 20 to timing rollers 21, which are arranged in the vicinity of the transfer means 23. When fed to the timing roller 21, the front edges of the copying sheets are detected by a sensor 22 so as to intercept the driving force from transmitting to the rollers 20 and so on.

The sizes of the copying sheets accommodated in the cassettes 16 and 17 correspond to the respective sizes of the microimages on the microfilm 1, which may be any combination of sheet sizes, such as A3 and A4, as well as B4 and B5, A4 and B5, and the like. It is also possible to increase the number of cassettes so that the variety of sheet sizes can be increased.

The latent image formed on the photosensitive media 12 as mentioned above is then developed by adhering toner thereto and transferred to the copying sheet supplied by the timing roller 21 driven synchronously with the forward edge of the developed image on the photosensitive media 12. The transferred sheet is then fed by a feeding means 24 to a heating and fixing station 25, in which the transferred image is fixed on the copying sheet. Then the copied sheet is discharged by rollers 26 to a copy tray 27 located in a front part of the printer body. In FIG. 7, reference numeral 45 indicates a roll-film carrier, and 46 a control board.

Detecting Means

Figure 10:
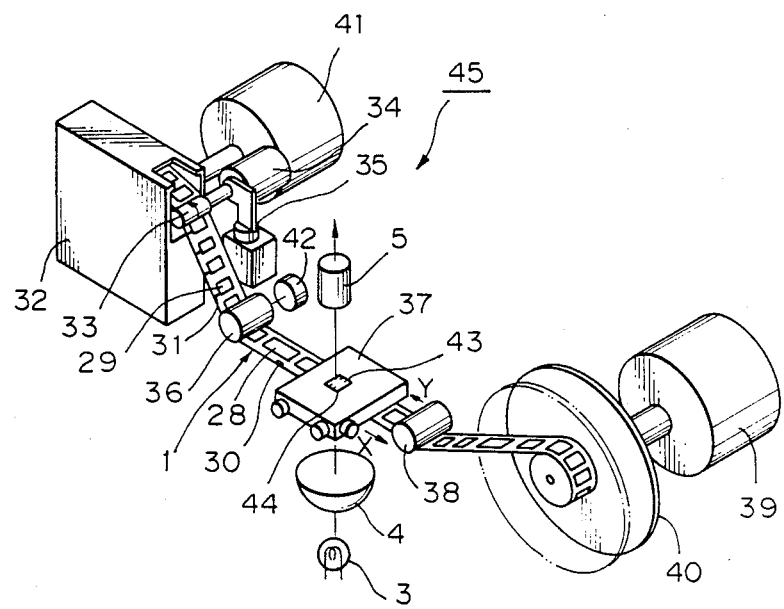
FIG. 10 is a perspective view illustrating a roll film carrier.

FIG. 10 is a perspective view illustrating a roll film carrier 45, in which reference numeral 1 indicates a roll film type microfilm; 3, a light source; 4, a condenser lens; 5, a projecting lens; 32, a roll film cartridge; and 33, a feed roller for feeding the microfilm 1 accommodated in the cartridge 32. The feed roller 33 is rotated by a drive motor A 34 and comes into contact with the microfilm 1 in the cartridge 32 when a solenoid 35 is turned ON, but moves away from the microfilm 1, when the solenoid 35 is turned OFF. The microfilm 1 supplied from the cartridge 32 by the feed roller 33 is then guided along an idle roller 36 and transported in the direction X to the plate portion 37. Then, it is guided again along an idle roller 38 and taken-up by a spool 40 rotated by a driving motor 39. A drive motor 41 serves to rewind the microfilm 1 in the direction Y opposite to X, to accommodate the film in the cartridge 32. An encoder 42 is connected to the idle roller 36 to generate a pulse signal in proportion to the distance moved by the microfilm 1. The plate portion 37 is provided at the center thereof with an aperture 43, which is located so as to be aligned with the microimages 28 and 29 of the microfilm 1 and between the condenser lens 4 the projecting lens 5.

A detecting means 44 serves to detect the size marks 30 and 31 of the respective microimages 28 and 29 as well as the presence of such size marks. This detecting means 44 is arranged at or over the aperture 43 of the plate portion 37 so as to receive optical signals from the light source 3, which signals have been transmitted through the size marks 30 or 31, or film base F thereafter, and to output electrical signals when detecting the size marks 30 and 31. The detecting means 44 may be made from any one of photoelectric elements, such as CdS, or any one of photovoltaic elements, such as SPD, or may be one of any other elements generally used for such a purpose. The number, position, or arrangement of such detecting elements should be determined in accordance with the actual embodiments of the detected objects, i.e., the size marks 30 and 31. The timing for detecting the size marks 30 and 31 may be the time when the microimages 28, 29 are projected onto the screen 2 in the reading mode, or the time for retrieving or searching by means of blip marks B, or the time when the printing key is ON, or any other time.

FIG. 11 illustrates a first embodiment of the detecting means 44 including two detecting elements, one for detecting long size marks 30L and the other for detecting short marks 31L. That is, the detecting means 44 in this embodiment includes two optical fibers 47 and 48 having light receiving portions 49 and 50, respectively, which are arranged in series in the longitudinal direction of the microfilm 1 so as to face the long and short size marks 30L and 31L and the film base F therearound, and are connected to first and second optical detecting elements 51 and 52 respectively. The optical signals from the long and short size marks 30L and 31L and the film base F therearound are received by the respective light receiving portions 49 and 50 and transmitted through the optical fibers 47 and 48 to the first and second optical detecting elements 51 and 52, whereby the optical signals are changed to electrical signals. The distance between both light receiving portions 49 and 50 is shorter than the shorter size mark 31L, and is determined so that noise is not generated. In the illustrated embodiment, although the detecting means 44 and the long and short size marks 30L and 31L also serve for the blip marks B, exclusive marks and an exclusive detecting means may be, of course, employed. This also applies to the other embodiments as mentioned hereinafter. The optical fibers 47 and 48, the first and second detecting elements 51 and 52, and the like, are covered by a cover member K and mounted on the plate portion 37 around the aperture 43.

Control System

A control means 53 selectively outputs a sheet supply signal to the sheet supplying means 13 in accordance with the detected signals obtained by the above-mentioned detecting means 44.

Figure 12:
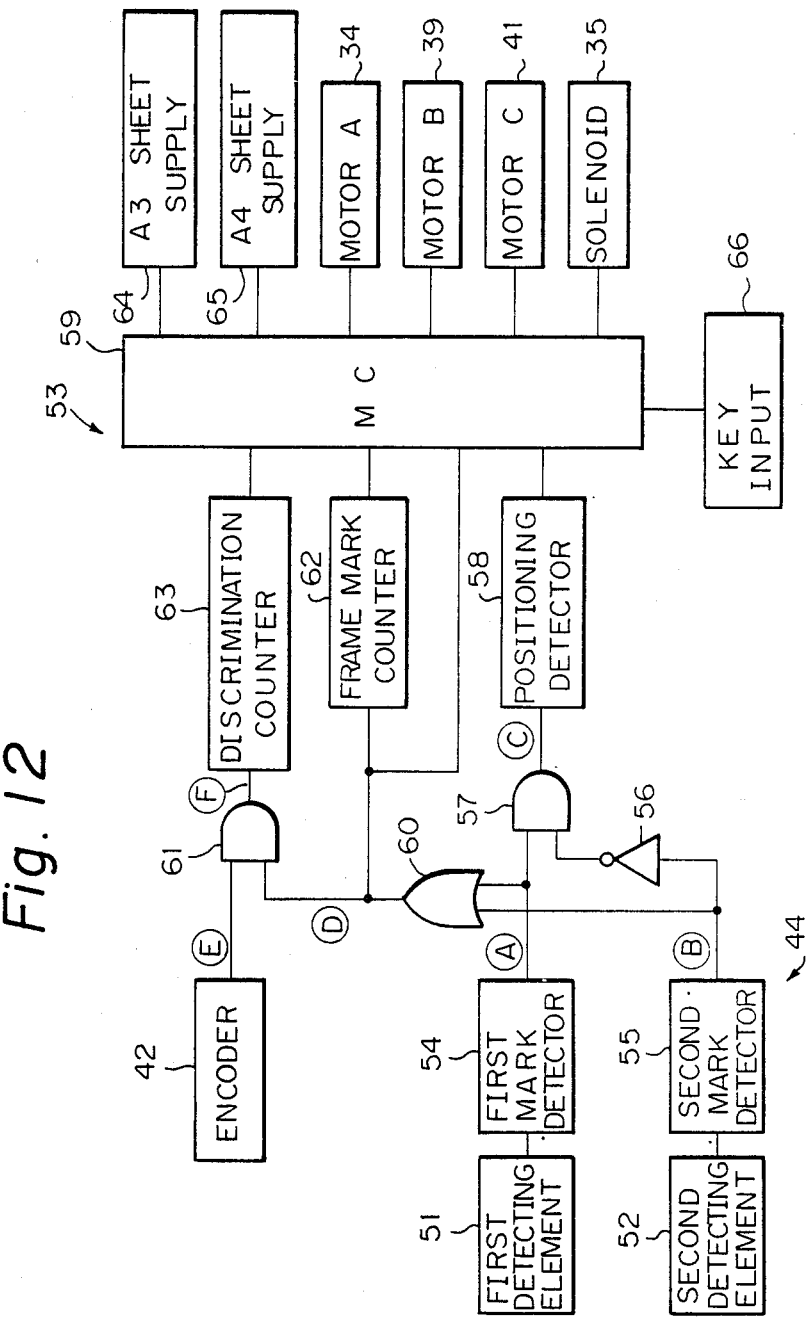
Figure 13:
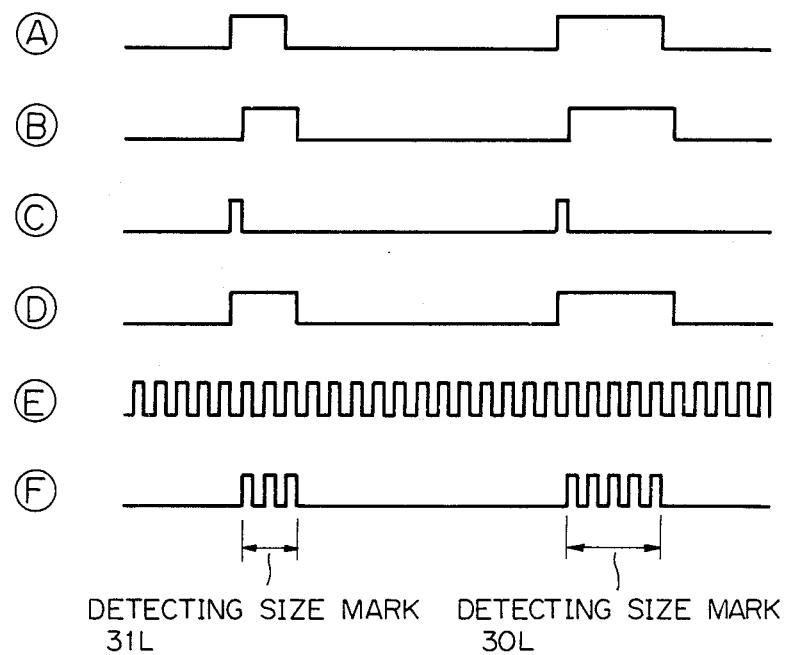

FIG. 12 is a block diagram showing a first embodiment of the control means 53. FIG. 13 is a timing chart illustrating the various signals in this control means 53 and shows the signals of the size marks 30L and 31L passing through the first and second detecting elements 51 and 52, where the speed of the microfilm 1 is constant.

First and second mark detectors 54 and 55 are buffers for the first and second detecting elements 51 and 52, respectively, of the detecting means 44. These detectors 54 and 55 receive the output signals from the corresponding detecting elements 51 and 52, respectively, amplify and reform the wave of the signals, and generate mark-detected signals (A) and (B), such as voltage level "1" or the like, when the first and second detecting elements 51 and 52 detect the size marks 30L and 31L. The mark-detected signals (A), and the signals (B) reversed therefrom through a NOT gate 56, are sent to an AND gate 57, and an output signal (C) therefrom is sent to a positioning detector 58, an output of which is supplied to the microcomputer 59. The mark-detected signals (A) and (B) are sent to an OR gate 60, an output of which is given as a frame mark signal (D) to an AND gate 61, a frame counter 62, and the microcomputer 59.

The AND gate 61 is opened or closed in accordance with the frame mark signal (D) and receives the pulse signal (E) from the encoder 42. Therefore, the number of pulses (F) which have passed while the gate is open, on the basis of the frame signal (D), is counted in a counter 63, so that the count "n" in the counter 63 corresponds to the length of the size mark 30L or 31L. Then, the count "n" is read out by the microcomputer 59 and compared with a predetermined value "$n_0$" to discriminate the size of the microimage 28 or 29, so that the status of the size flag m corresponding to the frame number m is determined. The microcomputor 59 selectively outputs a signal 64 for A3 sheets or a signal 65 for A4 sheets to the sheet supplying means 13 in accordance with the status of the size flag m. Therefore, in the sheet supplying means 13, a drive means is changed so as to drive either the pick-up roller 14 or the pickup roller 15 to supply the corresponding A3 or A4 size copying sheets to the transferring means 23 from the corresponding sheet cassettes 16 or 17.

The positioning of the microfilm 1 is carried out as follows. The microcomputor 59 outputs control signals to the motor 39 and motor 41 in accordance with input of the above-mentioned frame mark counter 62, frame mark signal (D), and input of the positioning detector 58. Thus, microfilm 1 is transported in the direction X and searched. If the count number of the frame mark counter 62 reaches the frame m in question, the microfilm 1 once passes through the aperture 43 until the frame mark signal (D) is turned OFF while the frame mark signal (D) is observed. Then, the microfilm 1 is reversed in the rewinding direction Y and controlled by the signal from the positioning detector 58, and the microimage 28 or 29 in question is positioned at a projecting position facing the aperture 43 and is stopped.

In this embodiment, the size discrimination as mentioned above is carried out while the microfilm 1 is positioned as such. In addition, although two kinds of sizes are discriminated in this embodiment, three or more sheet sizes also can be discriminated. In this case, the sheet supplying means should be, of course, constructed to supply three or more sizes sheets, correspondingly. In FIG. 12, key input for instructing the count number m is indicated at 66.

Operation of Reader/Printer

Figure 14:
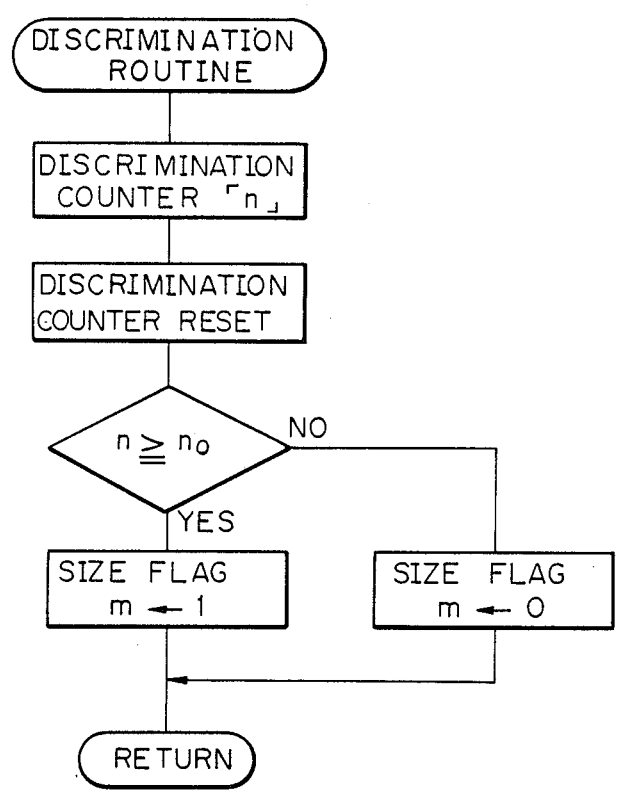

FIG. 14 (1) illustrates a basic control process. When a main switch is turned ON, and therefore the light source 3 is also turned ON, the system is started. The microfilm 1 supplied and transported from the cartridge 32 is irradiated with the light from the light source 3 at a position opposite to the aperture 43 of the plate portion 37. Then the initializing, reading, and retrieval processes are conducted in succession.

FIG. 14 (2) illustrates a retrieval routine. After a key input, registering processes, such as setting frame for searching, are processed, and a retrieval process is started when a search key is turned ON. The frame m in question is retrieved by the frame marks, i.e., blip marks B, of the microimages 28 and 29 and stored in a memory for positioning. The size discrimination process is carried out by means of size marks 30L and 31L.

FIG. 14 (3) illustrates a discrimination routine. The optical signal from the size mark 30 or 31 of the microimage 28 or 29 is detected by the detecting means 44. In accordance with the signals from the first and second detecting elements 51 and 52, the count "n" in the discriminating counter 63 is read out by the microcomputor 59. The counter 63 is reset for a counting operation for the next frame.

In the microcomputor 59, size discrimination of the microimage 28 or 29 is conducted by comparing the count value with the above-mentioned predetermined value "$n_0$". The value "$n_0$" is predetermined as a value between "n" for A3 size and "n" for A4 size. If the count "n" for A3 is 5 or 6 and the count "n" for A4 is 3 or 4, the value "$n_0$" can be set as 5, since the count "n"

is substantially constant and corresponds to the distance of sheet transportion, regardless of the speed thereof.

If "n≧n₀" (YES), the status of the size flag m corresponding to the frame number m of the microimage 28 is set as A3, i.e., "1". If the result is NO, the status of the size flag m corresponding to the frame number m of the microimage 29 is set as A4, i.e., "0". The process then returns to the start.

The purpose of size discrimination is thus attained by conducting such discrimination only for the microimage 28 or 29 in question. But it would be more effective if the size flag m and the status thereof are set, in a place of the flag area m of the memory corresponding to the frame number m in question, and thereafter printing is conducted with reference to the status thereof for the frame which has been once discriminated. In such an embodiment, since the size discrimination can be done while passing through the frames, it would be more advantageous if, during the search operation, all of the frames passing therethrough are subjected to the size discrimination, and thereafter the printing process is effected with reference to the status of the memorized respective size flag m.

After being returned to the routine of FIG. 14 (1), when a print key is turned ON, the size flag m corresponding to the frame number m of the microimage 28 or 29 in question is recalled and a status discrimination is carried out to determine whether or not the status m=1. The microcomputor 59 of the control means 53 selectively outputs a sheet supply signal for supplying either A3 or A4 copying sheets. Thus, as mentioned above, the sheet supply means 13 selectively supplies either A3 or A4 size copying sheets to the transferring means 23 for printing. After the printing process, the system is returned to the reading mode.

Thus, a correct size of copied sheet corresponding to the microimage 28 or 29 can be easily obtained. In addition, the above-mentioned processes, such as detecting, discriminating, and supplying sheets are automatically carried out without trouble to the operator, and the copying of a group of frames can be smoothly carried out even if they include different sizes of microimages 28 and 29.

Other Embodiments of Reader/Printer

Figure 16:
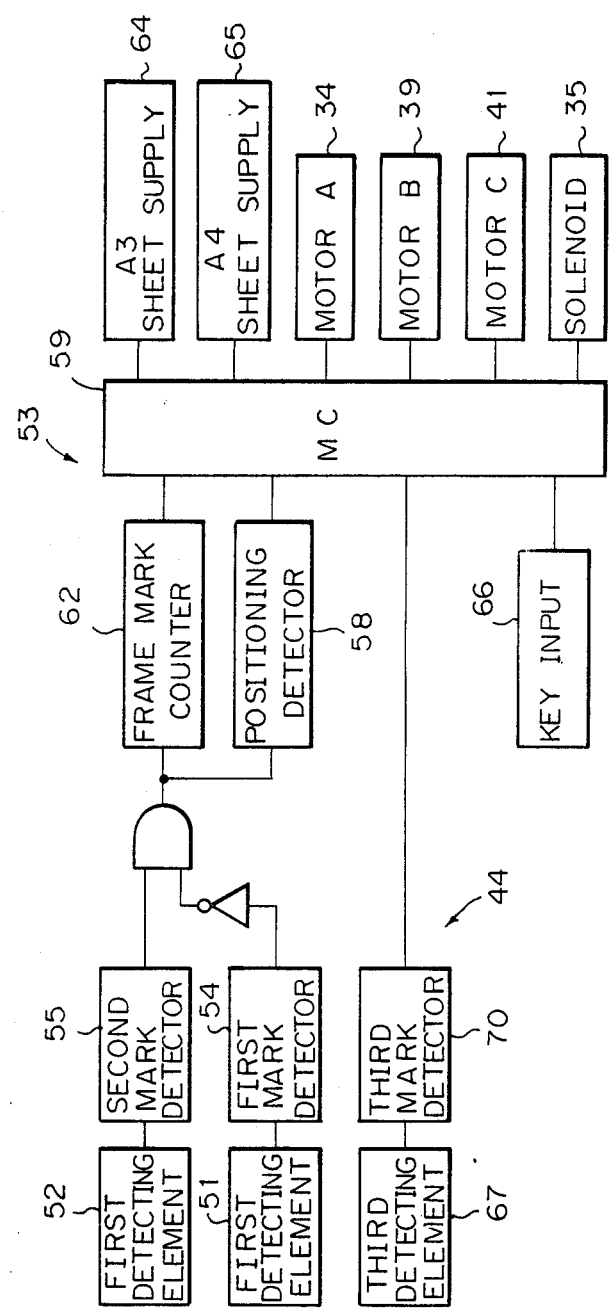
Figure 17:
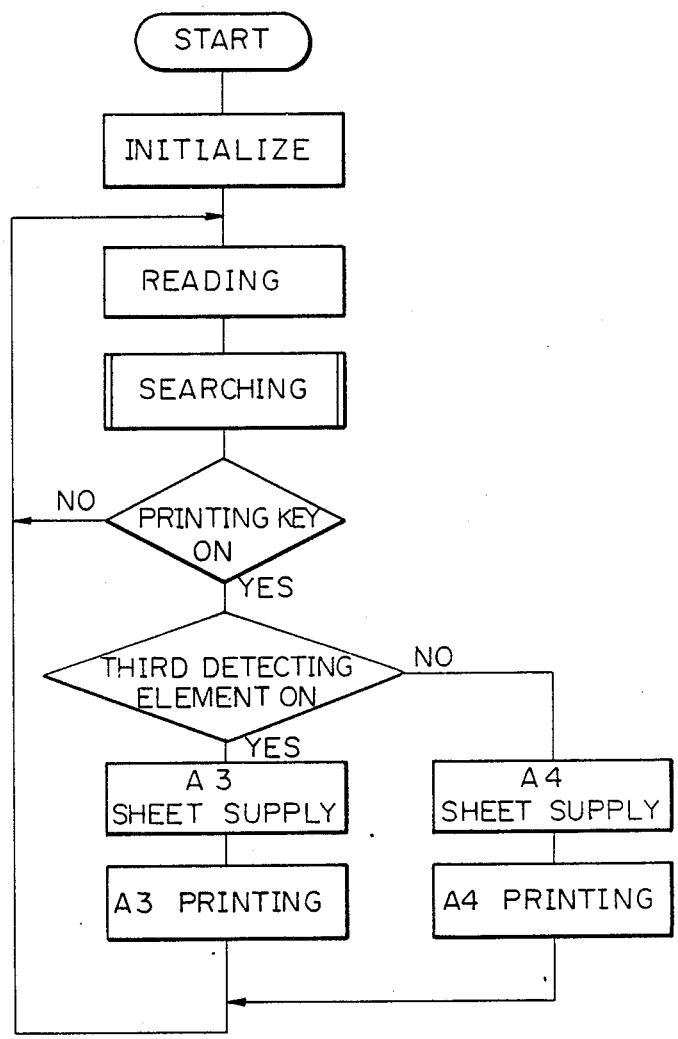

The detecting means 44 and the control means 53 also can be constructed as follows. FIGS. 15, 16, and 17 illustrate second and third embodiments of the present invention, in which FIGS. 15 (1) and (2) show the second embodiment of the means for detecting long and short size marks 30L and 31L, and FIGS. 15 (3) and (4) show the third embodiment of the detecting means for detecting wide and narrow size marks 30W and 31W. FIG. 16 shows a block diagram of the control means 53, and FIG. 17 shows a flow chart of the basic control.

In the second and third embodiments, first and second detecting elements 51 and 52 serve only to detect blip marks B, and a third detecting element 67 serves to detect size marks 30 and 31. The optical signal from the size marks 30L, W and 31L, W and the film base F therearound is received by a light receiving portion 68 and transmitted through an optical fiber 69 to the third optical detecting element 67, by which the optical signal is changed to an electrical signal. The detected signal is transmitted to a third mark detector 70. The microcomputor 59 observes whether the output signal from the third detector 70 is ON or OFF while a frame counter is counting the frame number m and effects the size discrimination. In the second embodiment, the light receiving portion 68 of the third detecting element 67 is arranged in series in the longitudinal direction with respect to the light receiving portions 49 and 50 of the first and second detecting elements 51 and 52 so as to detect the size marks 30L and 31L. On the other hand, in the third embodiment, the light receiving portion 68 is arranged offset from the longitudinal line, on which the light receiving portions 49 and 50 are arranged, in the direction of width by a distance larger than the width of the narrower size mark 31W so as to detect the presence of size marks 30W and 31W. However, since the third detecting element 67 is not used for positioning, the light receiving portion 68 may be arranged at a position other than the illustrated position, provided that the location is limited by the shapes of the size marks 30W and 31W. Retrieval and positioning can be conducted in the same manner as in the above-mentioned first embodiment.

In these second and third embodiments, it is not necessary to measure the length and the like of the size marks 30 and 31 in correspondence to the transportation of the microfilm 1, and therefore, the encoder 42 for size discrimination is not necessary. The size discrimination can be done either when the microfilm 1 is transported or stopped. In FIG. 17, after the searching is in process, and after the printing key is turned ON, the size discrimination is conducted by observing the third detecting element 67.

Figure 19:
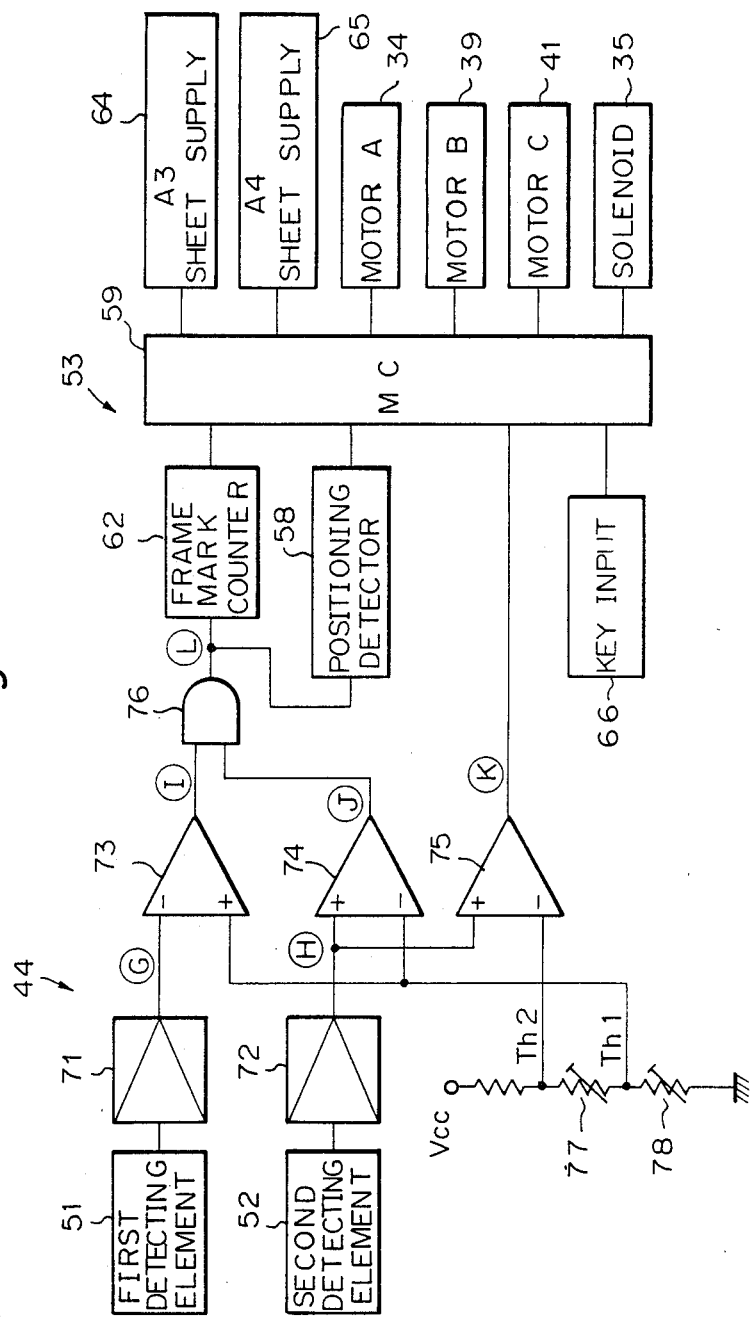
Figure 20:
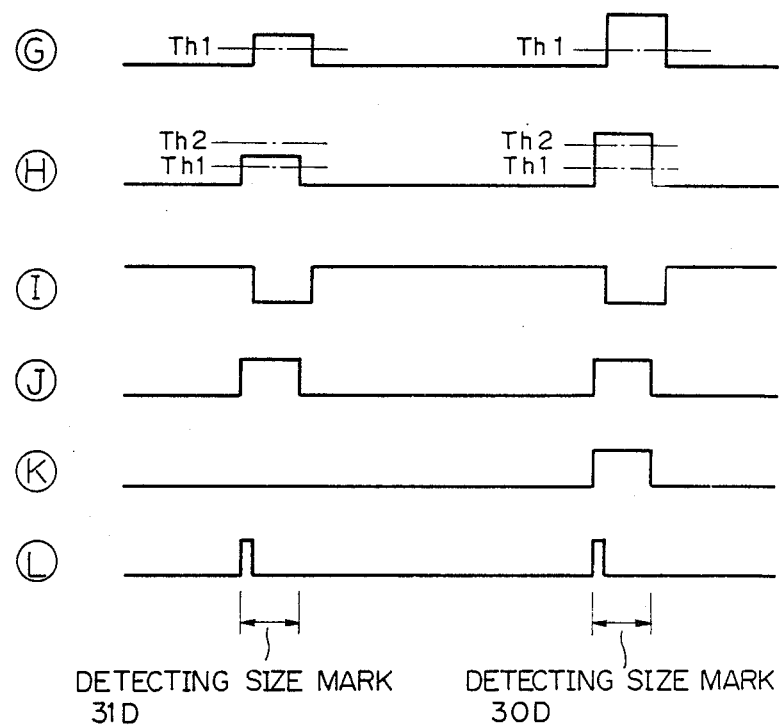
Figure 21:
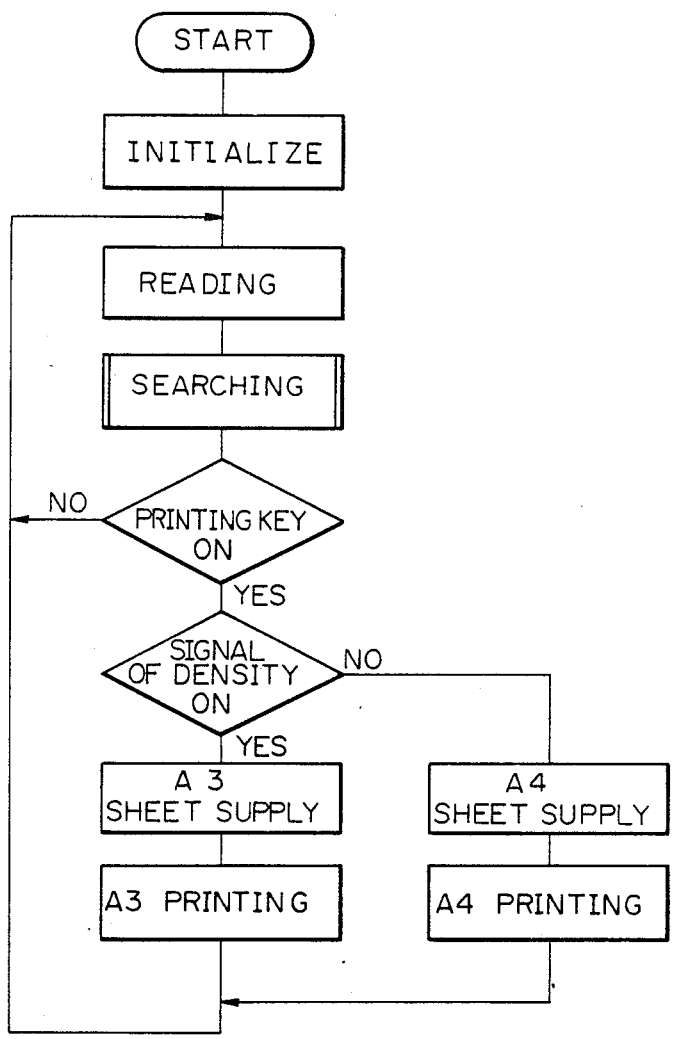

FIGS. 18 to 21 illustrate a fourth embodiment using dark size marks 30D and light size marks 31D, in which FIG. 18 shows the detecting means 44, FIG. 19 shows the control means 53, FIG. 20 shows the respective signals, and FIG. 21 shows a block diagram of the basic control.

The signals of the first and second detecting elements 51 and 52 for detecting the size marks 30D and 31D, respectively, are amplified by amplifiers 71 and 72 and supplied to comparators 73, 74, and 75 as signals Ⓖ and Ⓗ, respectively. The comparative voltage has two standard points Th1 and Th2. The signal Ⓖ or Ⓗ from the detecting element 51 or 52 for the positioned size mark 30D or 31D is divided by the two standard points Th1 and Th2. Th1 serves to detect the blip marks B. The signal Ⓘ or Ⓙ from the comparator 73 or 74 is reformed at an AND gate 76 to be a signal Ⓛ, which is supplied to a frame mark counter 62 and positioning detector 58 and input to the microcomputor 59 in which retrieval positioning is conducted. Th2 serves to initiate size discrimination. The signal Ⓚ for density is input from the comparator 75 to the microcomputor 59, in which size discrimination is carried out on the basis of a signal ON or OFF. Reference numerals 77 and 78 indicate semi-solid resistances for setting the level of density.

In the fourth embodiment, retrieval and positioning can be conducted in a conventional manner and it is easy to use the marks both as size marks 30D and 31D and as blip marks B.

Figure 23:
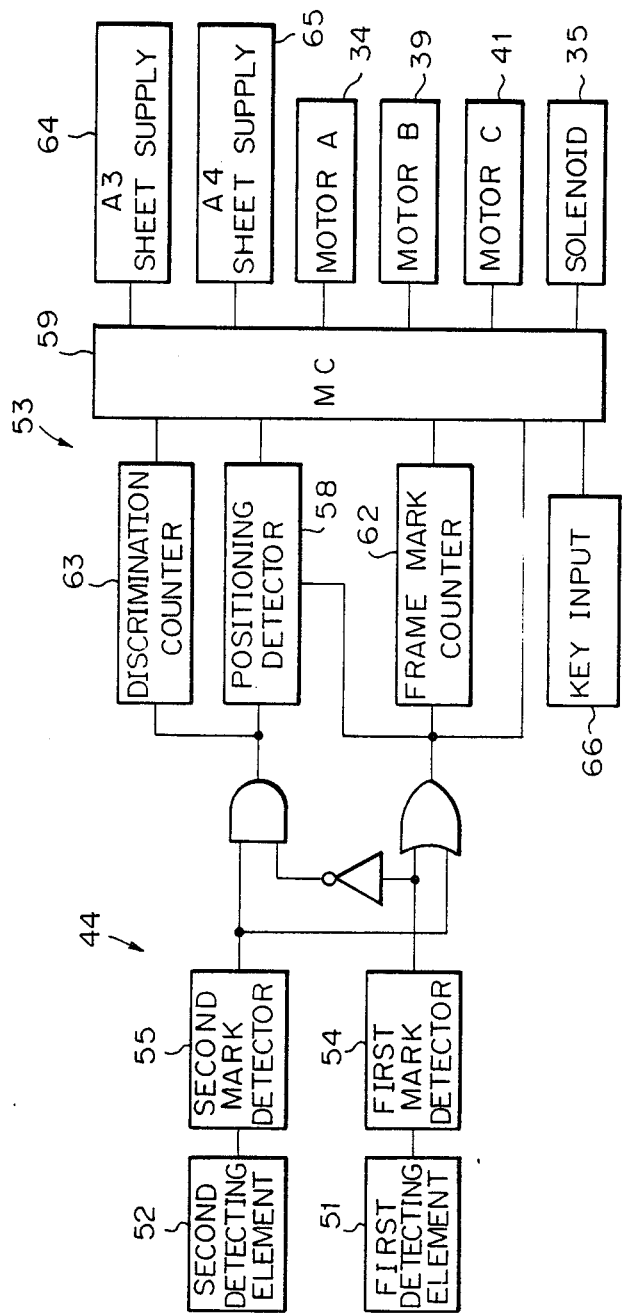
Figure 24:
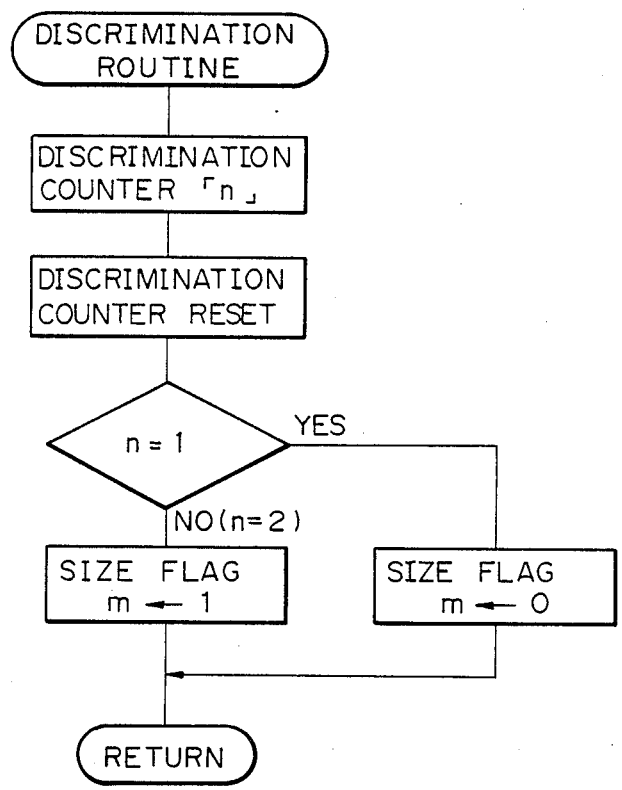

FIGS. 22, 23 and 24 illustrate a fifth embodiment using two size marks 30N and one size mark 31N, in which FIG. 22 shows the detecting means 44, FIG. 23 shows the control means 53, and FIGS. 24 (1), (2) and (3) show the control process thereof.

In this embodiment, the construction of the detecting means 44 is substantially the same as that of the first embodiment. However, since it is not necessary to measure the length of the size marks 30N and 31N, the encoder 42 for size discrimination is not necessary. In this embodiment, since the size discrimination can be conducted while the frames pass through, in the same manner as mentioned above in the first embodiment, it would be more effective to discriminate the size of the frames having passed through, and thereafter, to conduct the printing with reference to the status of the size flag m corresponding to the respective memorized frames.

After the size discrimination, the microfilm 1 is stopped and positioned. Since each size mark 30N consists of two marks, the manner of stopping the microfilm 1 must be taken into account. That is to say, the manner necessary when the microfilm 1 is transported in the direction X is different from that when it is transported in the rewinding direction Y. In the positioning detector 58 served for this purpose, the microfilm 1 might be stopped at a position corresponding to the head of the first mark of each size marks 30N and 31N. Therefore, when the microfilm 1 is transported in the direction X, it is correctly positioned if the microfilm 1 is returned in the rewinding direction Y and stopped at a position of the second positioning signal for the two size marks 30N, and a position of the first positioning signal for the single size mark 31N. On the other hand, when the microfilm 1 is transported in the rewinding direction Y, it is correctly positioned if the microfilm 1 is returned in the transporting direction X and stopped at a position of the first positioning signal for both the size marks 30N and 31N. In FIG. 24 (3), in the count "n" in the discrimination counter 63, "1" corresponds to A4 and "2" corresponds to A3.

Figure 26:
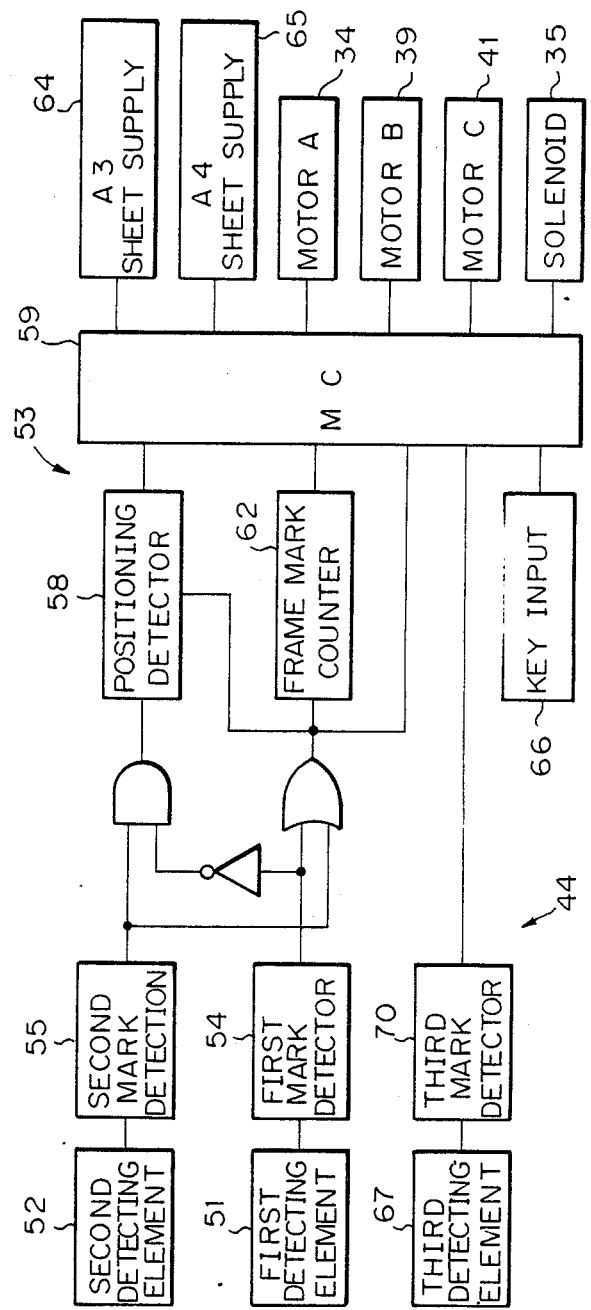
FIG. 26 shows the control means.
Figure 27:
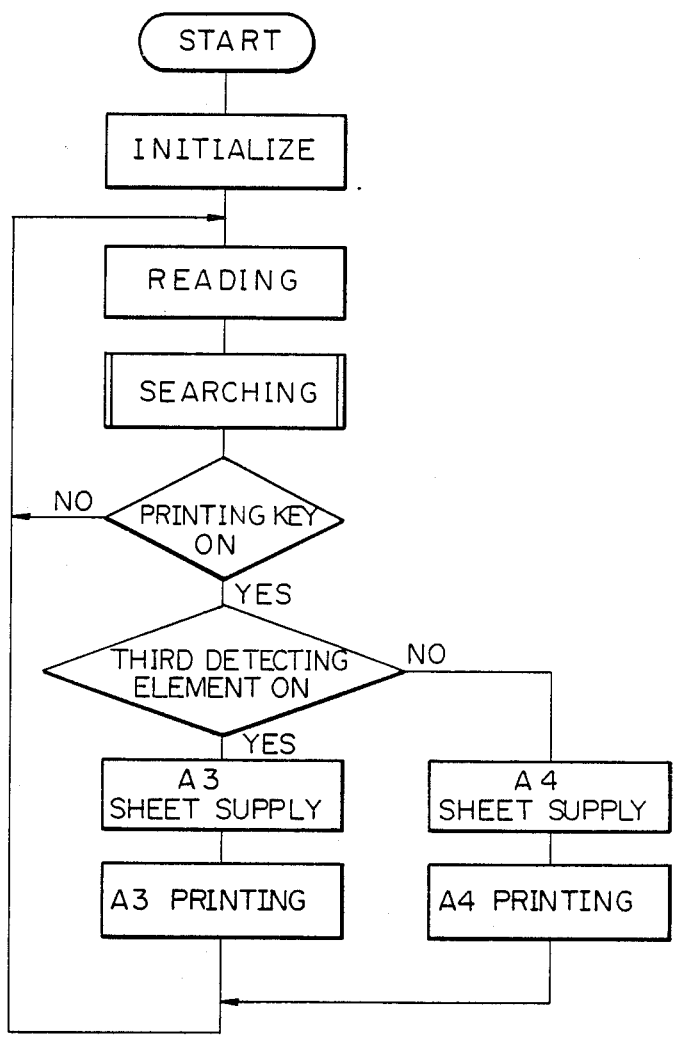
FIG. 27 shows the basic control process.

FIGS. 25, 26, and 27 illustrate a sixth embodiment for detecting two size marks 30N and one size mark 31N by an exclusive third detecting element 67, in which FIG. 25 shows the detecting means, FIG. 26 shows the control means 53, and FIG. 27 shows the basic control process.

The constructions of the previous fifth, second, and third embodiments are also applied to this sixth embodiment, in which, however, the size discrimination is conducted after the microfilm 1 is positioned and stopped, so that there is no problem in the timing of the size discrimination.

In the second, third, fourth, and fifth embodiments, other members, elements, circuits are indicated by the same or corresponding numeral references and marks, therefore the descriptions regarding the constructions, functions and operations of the first embodiment therefore may, of course, be applied to those of the above or any other embodiments.

We claim:

1. A microfilm comprising: a film base; a plurality of microimages defining film frames continuously formed on the film base; the microimages comprising at least two different sizes; the microimages being provided at peripheries thereof on the film base with size indicating means which comprises at least two different marks or a combination of no mark and at least one kind of mark, each of which has a distinctiveness for indicating the size of the corresponding microimage.

2. A microfilm as set forth in claim 1, wherein the microfilm is a roll film on which a series of microimages are continuously formed in the longitudinal direction, said roll film is provided with blip marks arranged along one of the sides of the roll film in the longitudinal direction, and said size indication marks are arranged along the other side of the roll film in the longitudinal direction.

3. A microfilm as set forth in claim 1, wherein said size indication mark consists of a signal mark area which also serves as a blip mark.

4. A microfilm as set forth in claim 3, wherein said size indication mark is distinguished by size, per se.

5. A microfilm as set forth in claim 3, wherein said size indication mark is distinguished by density or optical transparency.

6. A microfilm printer adapted for use with a microfilm comprising a film base, a plurality of microimages defining film frames continuously formed on the film base, each of the microimages being provided at a periphery thereof on the film base with a size indication means which has a distinctiveness for indicating the size of the corresponding microimage;

said printer comprising: means for enlarging and projecting said microimages of the microfilm on a photo-sensitive media, means for transferring the enlarged images on the photo-sensitive media to copying sheets, means for detecting said size indication means; means for controlling a sheet supplying signal in accordance with a signal from the detecting means; and means for selectively supplying the copying sheets on the basis of said sheet supplying signal from said controlling means.

7. A microfilm printer adapted for use with a roll film type microfilm comprising, a roll film base, a series of microimages defining film frames continuously formed on the film base in the longitudinal direction, said roll film being provided with blip marks arranged along one of the sides of the roll film in the longitudinal direction and size indication means arranged along the other side of the roll film in the longitudinal direction, said size indication means having a distinctiveness for indicating the size of the corresponding microimages;

said printer comprising: means for enlarging and projecting said microimages of the microfilm on a photo-sensitive media, means for transferring the enlarged images on the photo-sensitive media to copying sheets, means for detecting said size indication means; means for controlling a sheet supplying signal in accordance with a signal from the detecting means; means for selectively supplying the copying sheets on the basis of said sheet supplying signal from said controlling means, and means for detecting said blip marks to retrieve the frames of said microimages.

8. A microfilm printer adapted for use with a microfilm comprising a film base, a plurality of microimages defining film frames continuously formed on the film base, each of the microimages being provided at a periphery thereof on the film base with a size indication mark which has a distinctiveness for indicating the size of the corresponding microimage, said size indication mark consisting of a single mark area which also serves as a blip mark;

said printer comprising: means for enlarging and projecting said microimages of the microfilm on a photo-sensitive media, means for transferring the enlarged images on the photo-sensitive media to copying sheets, means for detecting said size indication marks; means for controlling a sheet supplying signal in accordance with a signal from the mark detecting means; means for selectively supplying the copying sheets on the basis of said sheet supplying signal from said controlling means, and means for retrieving the frames of said microimages also by detecting said size indication marks.

* * * * *